United States Patent
Chen et al.

(10) Patent No.: US 11,835,817 B2
(45) Date of Patent: Dec. 5, 2023

(54) LIGHT SOURCE MODULE AND DISPLAY APPARATUS

(71) Applicant: Coretronic Corporation, Hsin-Chu (TW)

(72) Inventors: Wei-Ju Chen, Hsin-Chu (TW); Chin-Lung Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/965,768

(22) Filed: Oct. 14, 2022

(65) Prior Publication Data

US 2023/0117209 A1    Apr. 20, 2023

(30) Foreign Application Priority Data

Oct. 19, 2021 (CN) .......................... 202122509687.X

(51) Int. Cl.
| | | |
|---|---|---|
| *G02F 1/00* | (2006.01) | |
| *G02F 1/13357* | (2006.01) | |
| *F21V 8/00* | (2006.01) | |

(52) U.S. Cl.
CPC ..... *G02F 1/133603* (2013.01); *G02B 6/0063* (2013.01); *G02F 1/133605* (2013.01)

(58) Field of Classification Search
CPC ......... G02F 1/133603; G02F 1/133605; G02B 6/0063; G02B 6/0023; G02B 6/0031
See application file for complete search history.

(56) References Cited

U.S. PATENT DOCUMENTS

| | | | | |
|---|---|---|---|---|
| 5,499,112 A | * | 3/1996 | Kawai ................. | G02B 6/0031 347/3 |
| 2011/0007522 A1 | * | 1/2011 | Iwasaki ............... | G02B 6/0068 362/613 |
| 2020/0395516 A1 | * | 12/2020 | Chen ................. | G02F 1/133606 |
| 2021/0397048 A1 | * | 12/2021 | Mochida ........... | G02F 1/133611 |

FOREIGN PATENT DOCUMENTS

| | | |
|---|---|---|
| CN | 102192450 | 9/2011 |
| JP | 2017091719 A * | 5/2017 |
| TW | 201612599 | 4/2016 |

* cited by examiner

*Primary Examiner* — Gerald J Sufleta, II
(74) *Attorney, Agent, or Firm* — JCIPRNET

(57) ABSTRACT

A light source module including a light guide plate, a light-emitting assembly and an optical film is provided. The light guide plate has a first surface, a second surface opposite to the first surface, a first side surface, a second side surface opposite to the first side surface, and a light incident surface connecting the first surface, the second surface, the first side surface and the second side surface. The light-emitting assembly is disposed beside the light incident surface and is adapted to provide a light beam toward the light incident surface. The optical film is disposed on the second surface. The optical film has a light-emitting surface parallel to the second surface and away from the light guide plate. The light-emitting surface includes a first edge region adjacent to the first side surface, a second edge region adjacent to the second side surface, and a central region.

8 Claims, 9 Drawing Sheets

LIGHT SOURCE MODULE AND DISPLAY APPARATUS

CROSS-REFERENCE TO RELATED APPLICATION

This application claims the priority benefit of China application serial no. 202122509687.X filed on Oct. 19, 2021. The entirety of the above-mentioned patent application is hereby incorporated by reference herein and made a part of this specification.

BACKGROUND

Technical Field

The disclosure relates to an optical apparatus, and particularly relates to a light source module and a display apparatus.

Description of Related Art

Liquid crystal display includes a liquid crystal display panel (LCD panel) and a backlight module, a light output from a general backlight module is to concentrate light at a front viewing angle. When a user observes a display image, a luminance of a peripheral region of the display image is darker than that of a central region of the display image, which a user's visual experience is not good. Especially when the backlight module adopts a collimated backlight technology, although the light utilization efficiency may be improved and the privacy function may be optimized, the dark periphery of the display image will be worse.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a light source module and a display apparatus, which is adapted to mitigate a problem that a central region is brighter and a peripheral region is darker of an image viewed by human eyes, so as to improve an image quality of the display apparatus.

Other objects and advantages of the disclosure may be further illustrated by the technical features broadly embodied and described as follows.

In order to achieve one or a portion of or all of the objects or other objects, an embodiment of the disclosure provides a light source module including a light guide plate, a light-emitting assembly and an optical film. The light guide plate has a first surface, a second surface opposite to the first surface, a first side surface, a second side surface opposite to the first side surface, and a light incident surface connecting the first surface, the second surface, the first side surface and the second side surface. The light-emitting assembly is disposed beside the light incident surface and is adapted to provide a light beam toward the light incident surface. The optical film is disposed on the second surface. The optical film has a light-emitting surface which is parallel to the second surface and away from the light guide plate. The light-emitting surface includes a first edge region adjacent to the first side surface, a second edge region adjacent to the second side surface, and a central region. The central region is located between the first edge region and the second edge region and includes a geometric center of the light-emitting surface. The first edge region, the second edge region, and the central region do not overlap with each other. An average luminance in the first edge region is greater than an average luminance in the central region. An average luminance in the second edge region is greater than the average luminance in the central region.

In an embodiment of the disclosure, a ratio of the maximum luminance in the second edge region to the maximum luminance in the central region is between 1.01 and 1.2.

In an embodiment of the disclosure, an arrangement direction of the first edge region and the second edge region is parallel to the light incident surface, and areas of the first edge region and the second edge region are the same, and a difference between the average luminance in the first edge region and the average luminance in the second edge region is less than 5% of the average luminance in the first edge region.

In an embodiment of the disclosure, the light-emitting surface further includes a third edge region and a fourth edge region, the third edge region is adjacent to the light incident surface, an arrangement direction of the third edge region and the fourth edge region is not parallel to the light incident surface, and the central region is located between the third edge region and the fourth edge region, an average luminance in the third edge region is greater than the average luminance in the central region, and an average luminance in the fourth edge region is greater than the average luminance in the central region.

In an embodiment of the disclosure, the light guide plate further includes a plurality of optical microstructures located on the first surface, and an area density of the optical microstructures is increased from the geometric center along a first direction and a second direction opposite to the first direction, and the area density of the optical microstructures is increased along a third direction, and the first direction is parallel to the light incident surface, and the third direction is parallel to a normal line of the light incident surface and is away from the light incident surface.

In an embodiment of the disclosure, the light guide plate further includes a plurality of optical microstructures on the first surface, and an area density of the optical microstructures corresponding to the first edge region is greater than an area density of the optical microstructures corresponding to the central region, and an area density of the optical microstructures corresponding to the second edge region is greater than the area density of the optical microstructures corresponding to the central region.

In an embodiment of the disclosure, the light source module further includes a reflector disposed on the first surface, and a reflectivity of the reflector is unevenly distributed.

In an embodiment of the disclosure, the reflectivity of the reflector is increased from the geometric center along a first direction and a second direction opposite to the first direction, and the reflectivity of the reflector is increased along a third direction, and the first direction is parallel to the light incident surface, and the third direction is perpendicular to the first direction.

In order to achieve one or a portion of or all of the objects or other objects, an embodiment of the disclosure provides a display apparatus including a light source module and a display panel. The light source module includes a light guide plate, a light-emitting assembly and an optical film. The light guide plate has a first surface, a second surface opposite to the first surface, a first side surface, a second side surface opposite to the first side surface, and a light incident surface connecting the first surface, the second surface, the first side surface and the second side surface. The light-emitting assembly is disposed beside the light incident surface and is adapted to provide a light beam toward the light incident surface. The optical film is disposed on the second surface. The optical film has a light-emitting surface which is parallel to the second surface and away from the light guide plate. The display panel is disposed above the light source module. The optical film is located between the light guide plate and the display panel. The light-emitting surface includes a first edge region adjacent to the first side surface, a second edge region adjacent to the second side surface, and a central region. The central region is located between the first edge region and the second edge region and includes a geometric center of the light-emitting surface. The first edge region, the second edge region, and the central region do not overlap with each other. An average luminance in the first edge region is greater than an average luminance in the central region. An average luminance in the second edge region is greater than the average luminance in the central region.

In an embodiment of the disclosure, the display apparatus further includes a privacy module, and the privacy module is located between the display panel and the light guide plate, or the display panel is located between the privacy module and the light guide plate.

Based on the above description, the embodiments of the disclosure have at least one of the following advantages or effects. In the light source module and display apparatus of the disclosure, the average luminance in the first edge region is greater than the average luminance in the central region, and the average luminance in the second edge region is greater than the average luminance in the central region. By designing the luminance of a periphery of a display region to be greater than that of the central region, the effects of optimizing an image quality of the display and enhancing a visual comfort experience of the human eyes are achieved.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
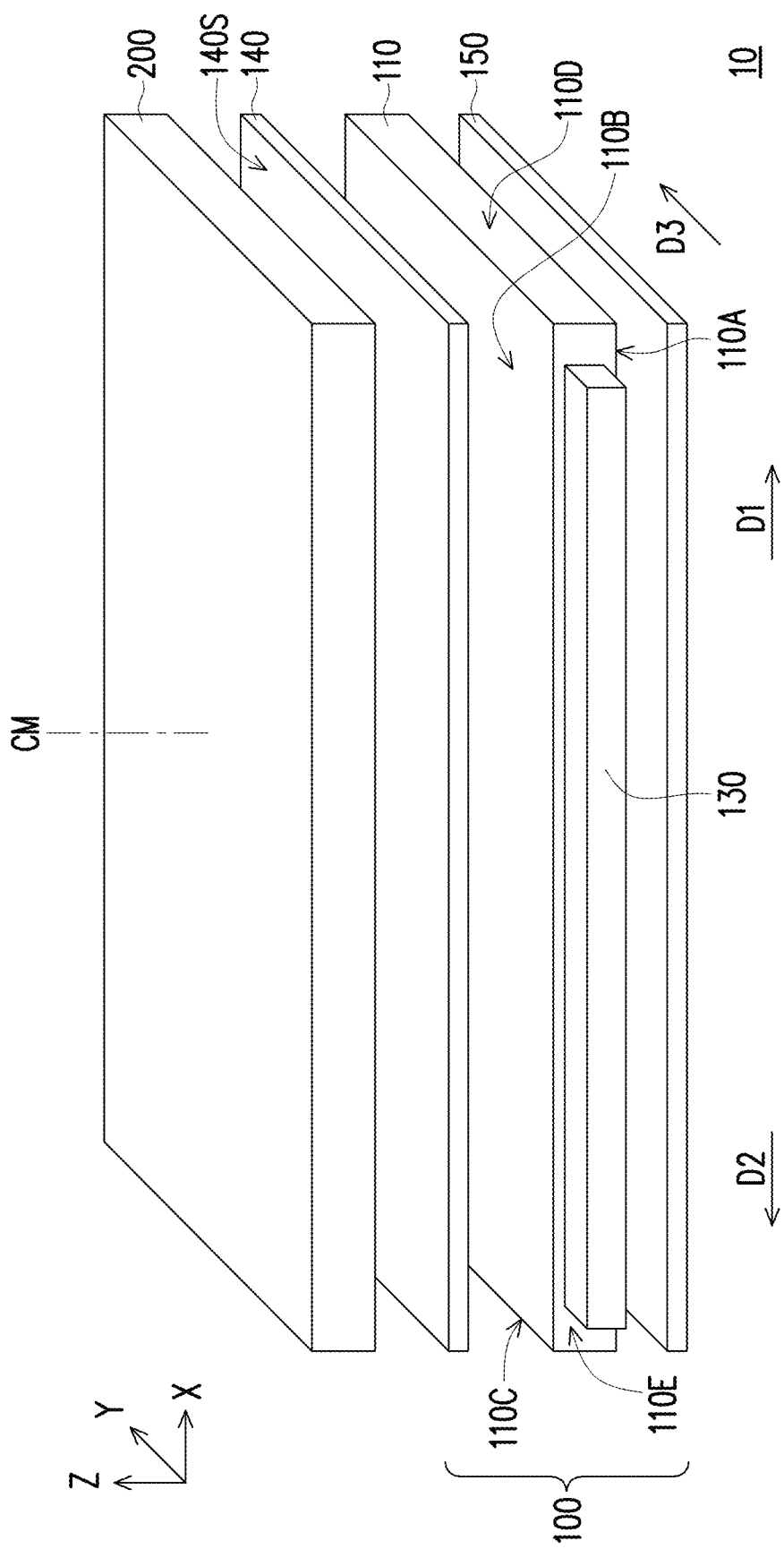
FIG. 1 is a three-dimensional schematic diagram of a display apparatus according to an embodiment of the disclosure.
Figure 2:
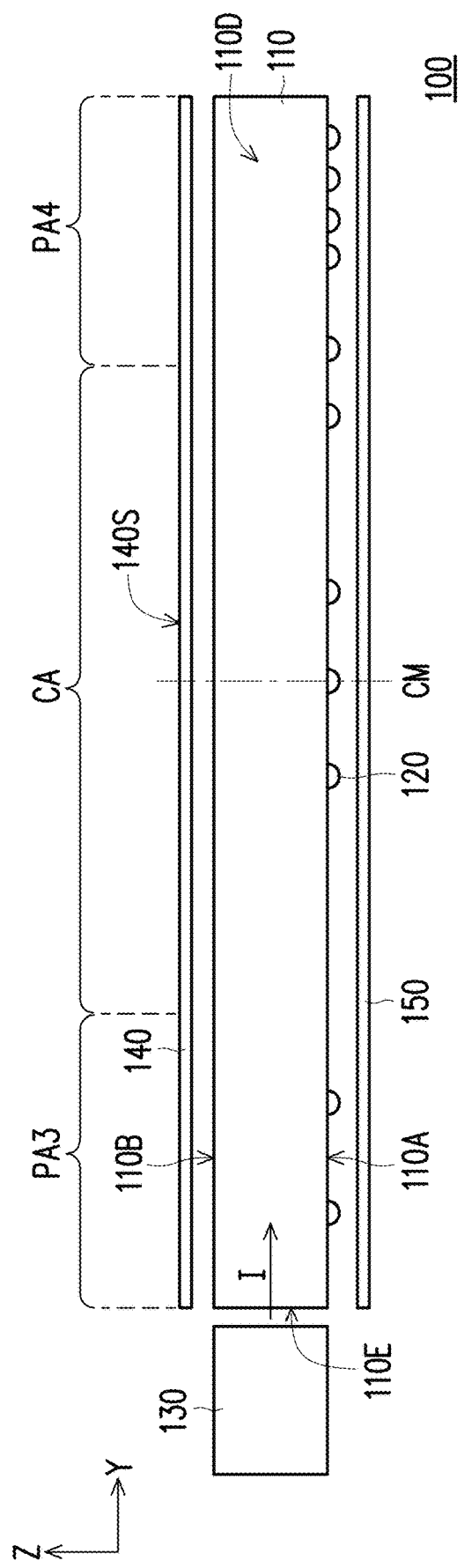
FIG. 2 is a schematic cross-sectional view of a light source module of the embodiment of FIG. 1.
Figure 3A:
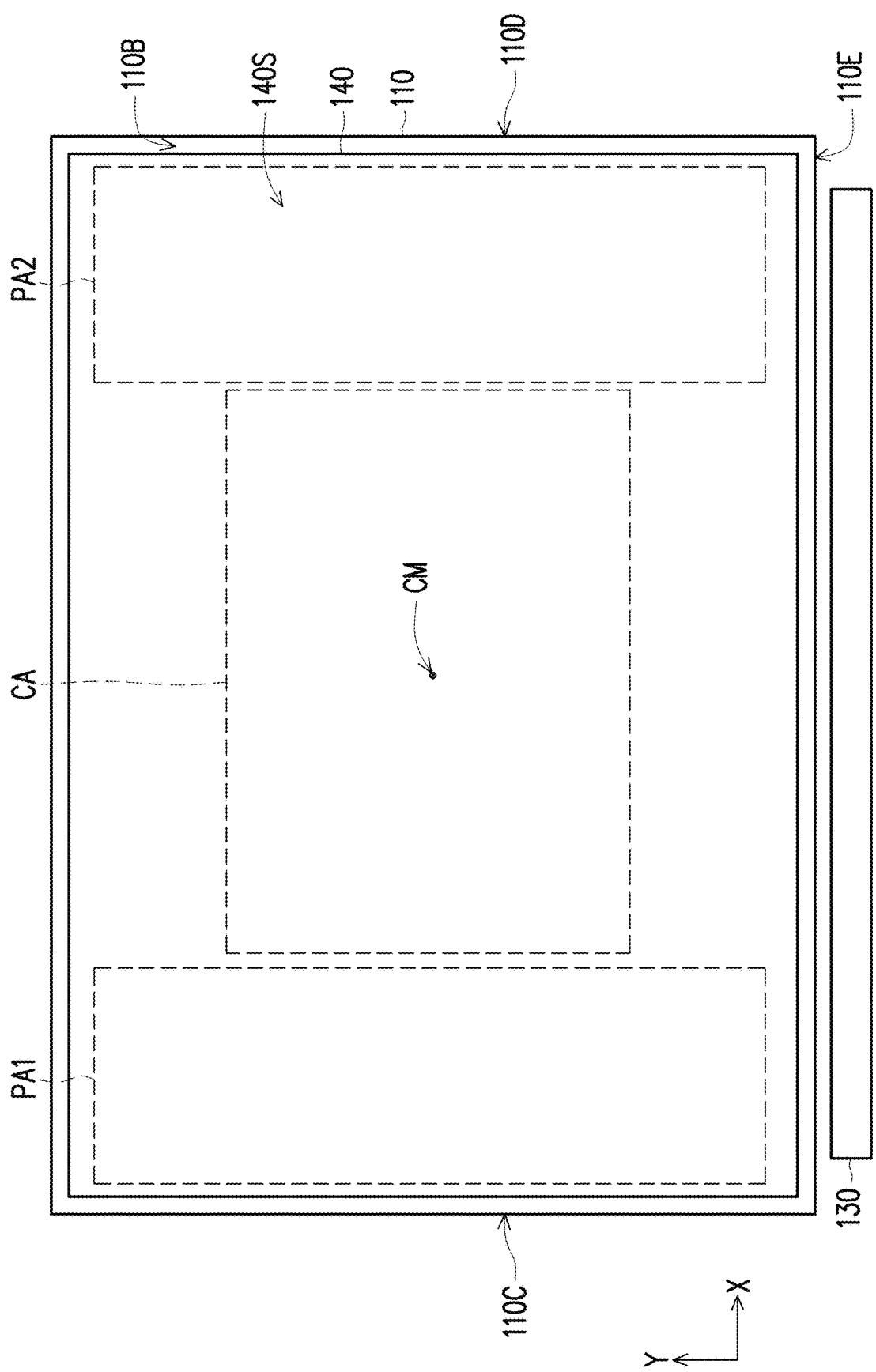
FIG. 3A and FIG. 3B are schematic top views of the light source module of FIG. 2.
Figure 3B:
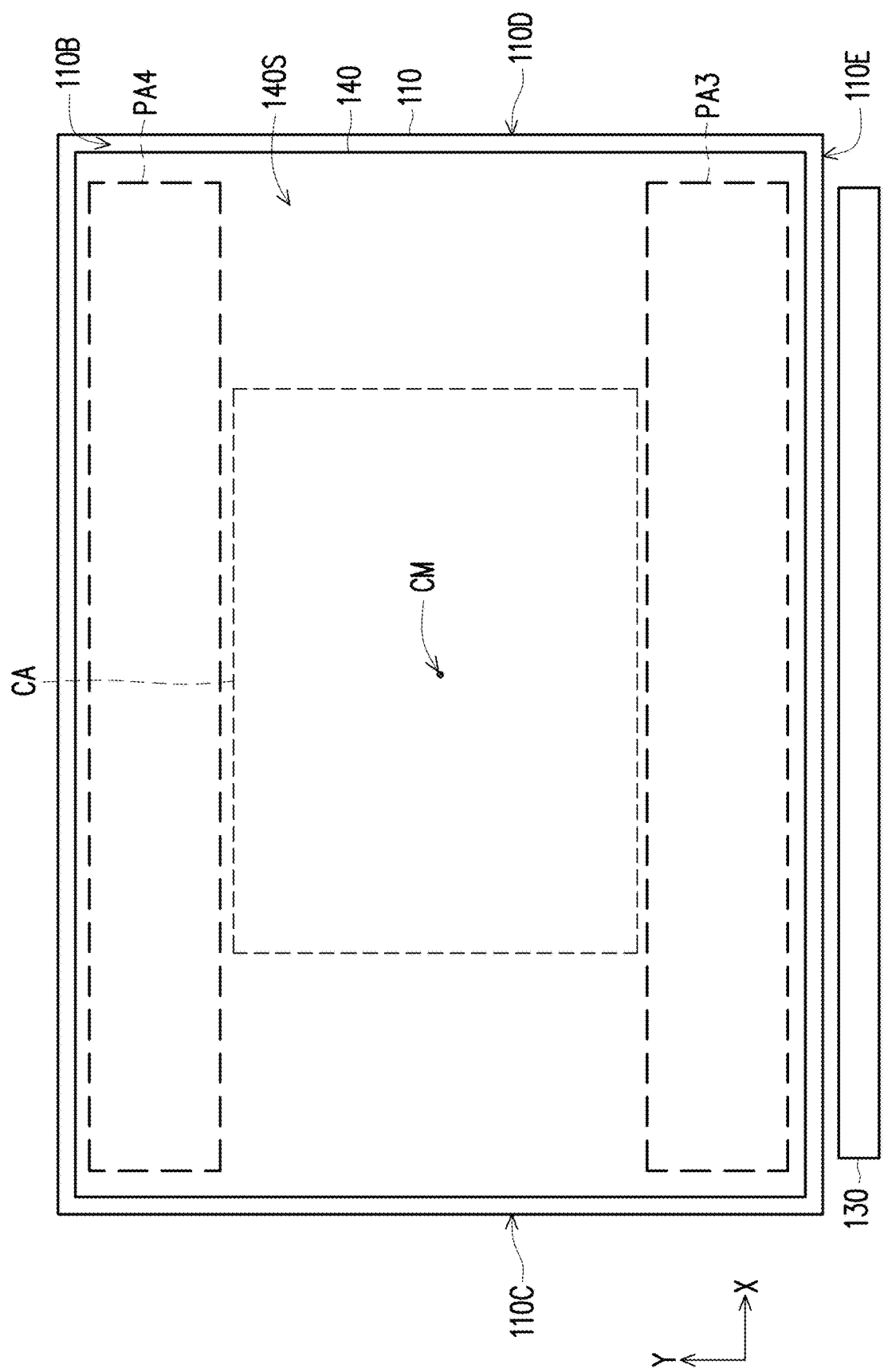

FIG. 1 is a three-dimensional schematic diagram of a display apparatus according to an embodiment of the disclosure. FIG. 2 is a schematic cross-sectional view of a light source module of the embodiment of FIG. 1. FIG. 3A and FIG. 3B are schematic top views of the light source module of FIG. 2. Referring to FIG. 1 to FIG. 3B, the display apparatus 10 includes a light source module 100 and a display panel 200. The light source module 100 includes a light guide plate 110, a light-emitting assembly 130 and an optical film 140. The light guide plate 110 has a first surface 110A, a second surface 110B opposite to the first surface 110A, a first side surface 110C, a second side surface 110D opposite to the first side surface 110C, and a light incident surface 110E connecting the first surface 110A, the second surface 110B, the first side surface 110C, and the second side surface 110D. The light-emitting assembly 130 is disposed beside the light-incident surface 110E and is adapted to provide a light beam I toward the light-incident surface 110E (as shown in FIG. 2). In the embodiment, the light-emitting assembly 130 may include a plurality of light-emitting elements (not shown) arranged in one direction, and the light-emitting elements are, for example, light-emitting diodes, but the disclosure is not limited thereto. In other embodiments, the light-emitting assembly 130 may also include one or a plurality of light tubes.

The optical film 140 is disposed on the second surface 110B. The optical film 140 has a light-emitting surface 140S (e.g., flat surface or virtual surface), and the light-emitting surface 140S is parallel to the second surface 110B and away from the light guide plate 110. The optical film 140 may include a prism film or an inverse prism film, a diffuser or a brightness enhancement film (BEF), and the optical film 140 is adapted to make the light beam leaving the light-emitting surface 140S to be substantially toward a direction perpendicular to the light-emitting surface 140S (for example, an included angle between a light-emitting angle of most of the light beams and the normal of the light-emitting surface 140S is less than 45 degrees). In some embodiments, the light source module 100 may include one or more identical or different optical films 140. In the embodiment, the optical film 140 includes an inverse prism film. The inverse prism film includes a plurality of prisms arranged on a side of the inverse prism film facing the light guide plate 110. In the embodiment, the light guide plate 110 is designed to emit light from the second surface 110B at a large angle, and the emitted light beam is then aligned by the inverse prism film to provide a collimated backlight, but the disclosure is not limited thereto. In other embodiments, the optical film 140 may also include, for example, two prism films, and a plurality of prism columns in the individual prism film are respectively arranged on a side of the prism film away from the light guide plate 110.

Further, as shown in FIG. 3A, the light-emitting surface 140S includes a first edge region PA1 adjacent to the first side surface 110C, a second edge region PA2 adjacent to the second side surface 110D, and a central region CA. The central region CA is located between the first edge region PA1 and the second edge region PA2, and a geometric center CM of the light-emitting surface 140S is located on the central region CA. The first edge region PA1, the second edge region PA2, and the central region CA do not overlap with each other. Namely, the first edge region PA1 is an edge portion of the light-emitting surface 140S that is closer to the first side surface 110C, the second edge region PA2 is an edge portion of the light-emitting surface 140S that is closer to the second side surface 110D, and the central region CA is a middle portion of the light-emitting surface 140S sandwiched between the first edge region PA1 and the second edge region PA2. According to another aspect, the first edge region PA1 and the second edge region PA2 respectively correspond to edge portions on both sides of a display region of the display apparatus 10, and the central region CA corresponds to a central portion of the display region of the display apparatus 10. In the embodiment, an arrangement direction of the first edge region PA1 and the second edge region PA2 is parallel to the light incident surface 110E (for example, arranged along an X direction in FIG. 3A). The above arrangement direction is, for example, defined by a connection line of center points of the regions, but the disclosure is not limited thereto. The first edge region PA1 and the second edge region PA2 have a same area (and/or a same shape), and a difference between an average luminance in the first edge region PA1 and an average luminance in the second edge region PA2 is less than 5% of the average luminance in the first edge region PA1. Namely, the first edge region PA1 and the second edge region PA2 are approximately symmetrically located on two sides of the light-emitting surface 140S with respect to the central region CA.

Further, the average luminance in the first edge region PA1 is greater than an average luminance in the central region CA, and the average luminance in the second edge region PA2 is greater than the average luminance in the central region CA. Namely, on the light-emitting surface 140S of the light source module 100, the luminance of the edge portions on both sides of the display region is greater than the luminance of the central portion of the display region. Therefore, regarding the image displayed by the display apparatus 10, regardless of the influence of dimming of individual pixels by the display panel (for example, the image displayed by the display apparatus 10 is a whit image), a peripheral luminance of the display region is greater than a central luminance. For the user, this kind of display image has better uniformity in the luminance viewed by human eyes in the entire display region. Therefore, the light source module 100 and the display apparatus 10 of the embodiment may achieve the effects of optimizing the image quality of the display and enhancing the visual comfort experience of human eyes. In some embodiments, a ratio of the maximum luminance in the first edge region PA1 to the maximum luminance in the central region CA is between 1.01 and 1.2 (or a ratio of the average luminance value in the first edge region PA1 to the average luminance in the central region CA is between 1.01 and 1.2). Under such condition, the light source module may enhance the visual comfort experience for the user without causing excessive visual interference.

On the other hand, referring to FIG. 3B, in the embodiment, the light-emitting surface 140S further includes a third edge region PA3 and a fourth edge region PA4. The third edge region PA3 is adjacent to the light incident surface 110E. The central region CA is located between the third edge region PA3 and the fourth edge region PA4, and the third edge region PA3, the fourth edge region PA4, and the central region CA do not overlap with each other. In other words, the third edge region PA3 is an edge portion on the light-emitting surface 140S closer to the light incident surface 110E, and the fourth edge region PA4 is an edge portion on the light-emitting surface 140S that is located on the other side of the central region CA. According to another aspect, the central region CA corresponds to a central portion of the image of the display region of the display apparatus 10, and the third edge region PA3 and the fourth edge region PA4 respectively correspond to the edge portions on both sides of the image of the display region of the display apparatus 10. An arrangement direction of the third edge region PA3 and the fourth edge region PA4 is not parallel to the light incident surface 110E (for example, arranged along the Y direction in FIG. 3B). In the embodiment, the arrangement direction of the third edge region PA3 and the fourth edge region PA4 is perpendicular to the light incident surface 110E, the third edge region PA3 and the fourth edge region PA4 have a same area, and the third edge region PA3 and the fourth edge region PA3 are approximately symmetrically located on two sides of the light-emitting surface 140S.

Figure 4A:
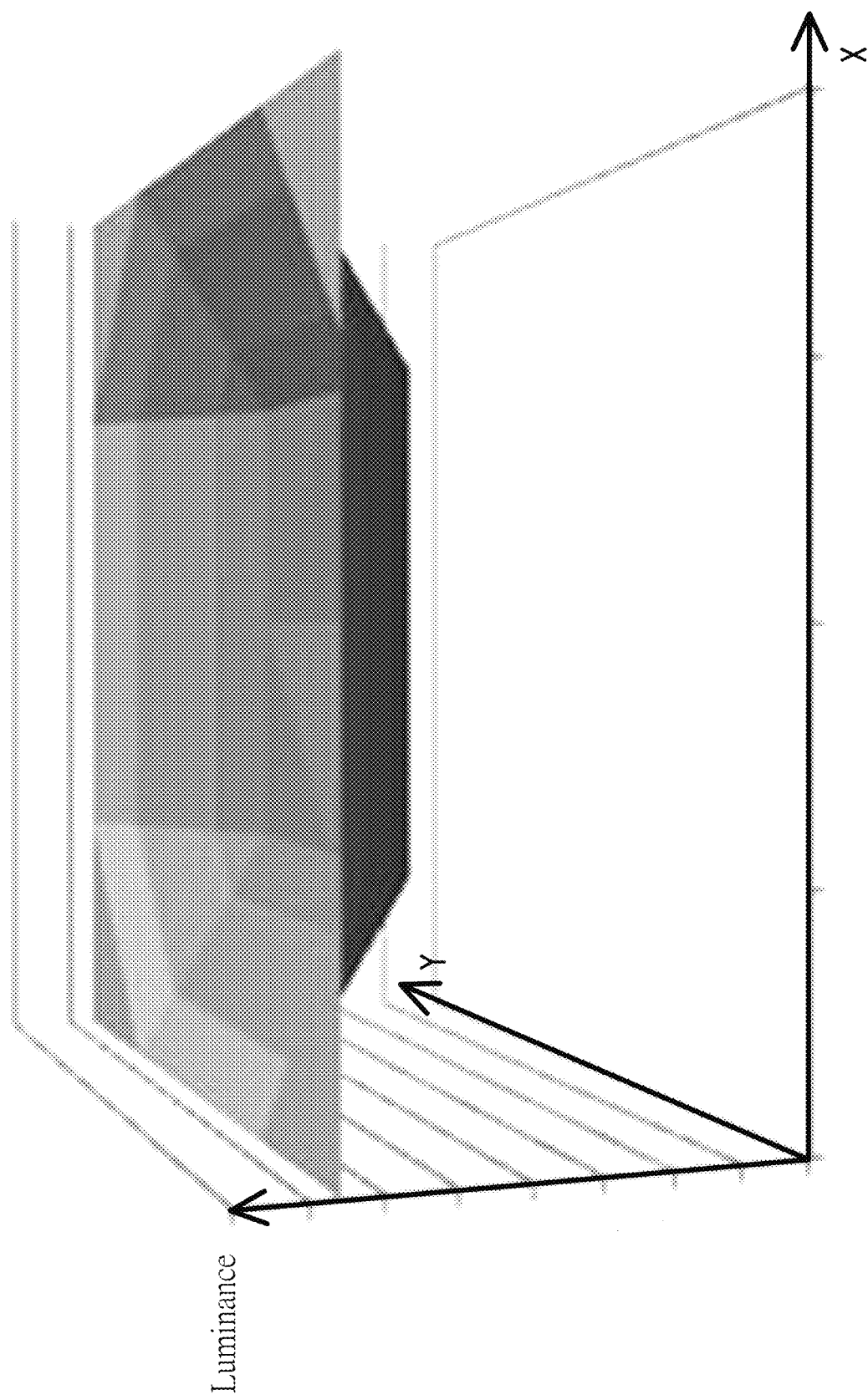
FIG. 4A is a schematic diagram of a luminance distribution of a light source module according to an embodiment of the disclosure.
Figure 4B:
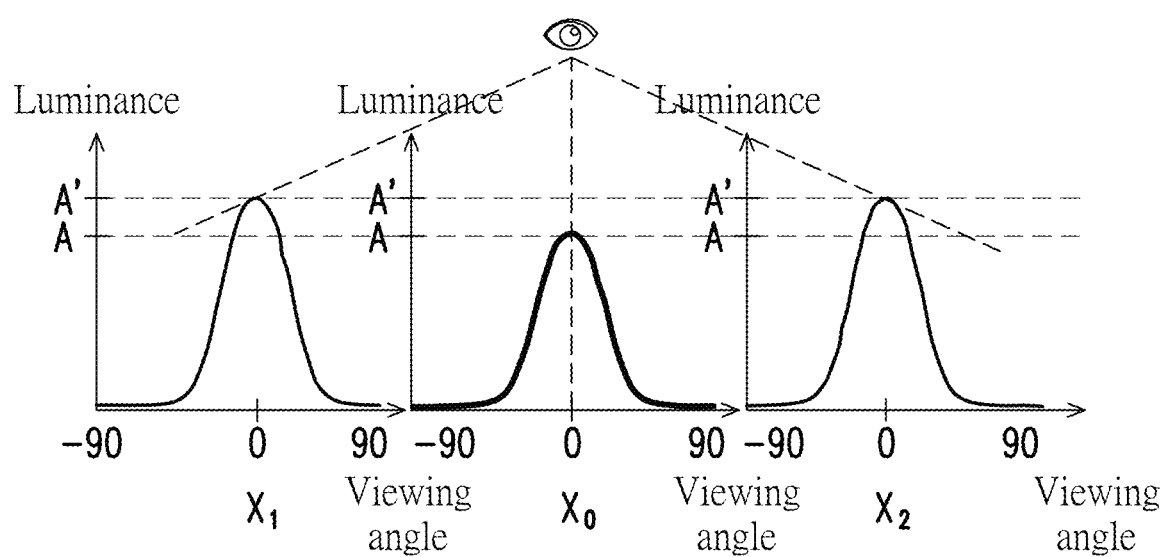
FIG. 4B is a schematic diagram of a viewing angle luminance distribution of the light source module at different positions according to an embodiment of the disclosure.

In the embodiment, an average luminance in the third edge region PA3 is greater than the average luminance in the central region CA, and an average luminance in the fourth edge region PA4 is greater than the average luminance in the central region CA. Namely, on the light-emitting surface 140S of the light source module 100, the luminance of the edge portion close to the light incident surface 100E and the luminance of the edge portion far away from the light incident surface 100E are both greater than the luminance of the central portion of the image corresponding to the display region. Therefore, as described in FIG. 3A and FIG. 3B, the light beam I from the light-emitting assembly 130 forms a light distribution pattern with a brighter periphery and a darker center on the light-emitting surface 140S. Specifically, FIG. 4A is a schematic diagram of a luminance distribution of a light source module according to an embodiment of the disclosure. FIG. 4B is a schematic diagram of a viewing angle luminance distribution of the light source module at different positions according to an embodiment of the disclosure. Referring to FIG. 1 to FIG. 4B at the same time, through the luminance design of each region of the embodiment, a light distribution on the light-emitting surface 140S may form a bathtub distribution pattern with brighter periphery and darker center (as shown in FIG. 4A, X-Y plane is the light-emitting surface 140S and Z-axis is the brightness). Further, as shown in FIG. 4B, the maximum light output luminance (front viewing angle) at the geometric center CM (a position X0) is A, and the maximum light output luminance (front viewing angle) located on two sides of the display region (positions X1, X2, for example, the center points of the first edge region PA1 and the second edge region PA2) is A', and a ratio of A to A' is about 0.8, but the disclosure is not limited thereto. In this way, for the user, this kind of display image has better uniformity in the luminance viewed by human eyes in the entire display region. Therefore, the light source module 100 and the display apparatus 10 of the embodiment may achieve the effects of optimizing the image quality of the display and enhancing the visual comfort experience for the user.

In the embodiment, the display panel 200 is disposed above the light source module 100. The optical film 140 is located between the light guide plate 110 and the display panel 200. In other words, the display panel 200 is disposed on a side of the light source module 100 close to the optical film 140. In the embodiment, the display panel 200 is, for example, a liquid crystal display panel (LCD panel), but the disclosure is not limited thereto. In other embodiments, the display panel 200 may also be an electrophoretic display panel (EPD panel) or other non-self-luminous display panels.

Figure 5:
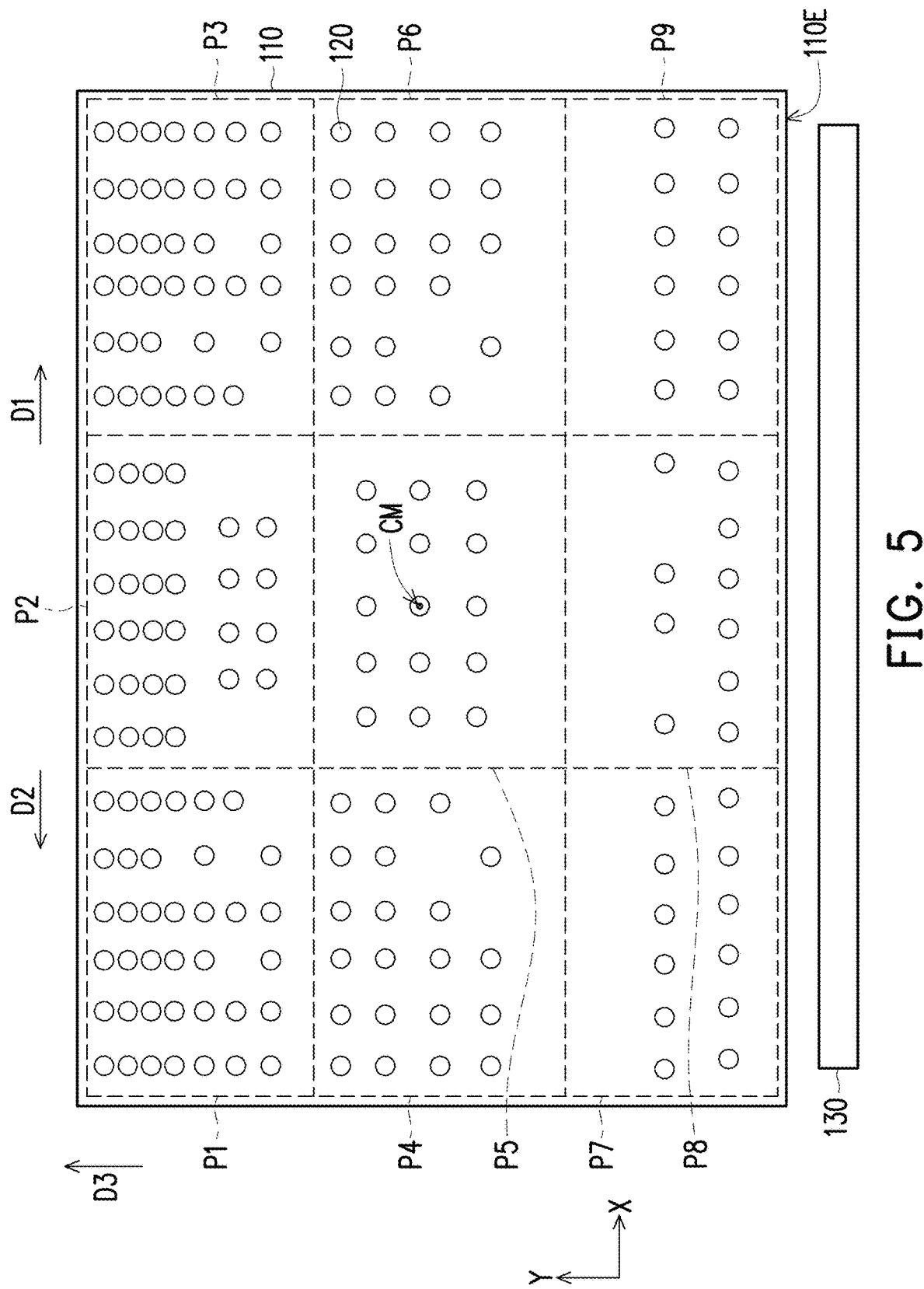
FIG. 5 is a schematic diagram of a light source module according to an embodiment of the disclosure.

FIG. 5 is a schematic diagram of a light source module according to an embodiment of the disclosure. Referring to FIG. 2 to FIG. 5 at the same time, in the embodiment, the light guide plate 110 further includes a plurality of optical microstructures 120 on the first surface 110A (the light guide plate 110 and the plurality of optical microstructures 120 are shown in a perspective manner in FIG. 5). The optical microstructures 120 may change the reflection condition, so that the light beam I entering the light guide plate 110 is emitted from the second surface 110B of the light guide plate 110.

In the embodiment, by configuring a distribution of the plurality of optical microstructures 120, an area density of the optical microstructures 120 is increased from the geometric center CM along a first direction D1 and a second direction D2 opposite to the first direction D1, and the first direction D1 and the second direction D2 are parallel to the light incident surface 110E. In this way, more light beams I are emitted from the second surface 110B of the light guide plate 110 at the edge portions on both sides of the image corresponding to the display region, so that on the light-emitting surface 140S of the light source module 100, the luminance of the edge portions on both sides of the image corresponding to the display region is greater than the luminance of the central portion of the image corresponding to the display region, so as to improve the luminance uniformity of the display image viewed by the human eyes. In the embodiment, by further configuring the distribution of the plurality of optical microstructures 120, the area density of the optical microstructures 120 is increased along a third direction D3, and the third direction is parallel to a normal line of the light incident surface 110E and is away from the light incident surface 110E. According to another aspect, by configuring the distribution of the plurality of optical microstructures 120, the area density of the optical microstructures 120 corresponding to the first edge region PA1 is greater than the area density of the optical microstructures 120 corresponding to the central region CA; and by configuring the distribution of the plurality of optical microstructures 120, the area density of the optical microstructures 120 corresponding to the second edge region PA2 is greater than the area density of the optical microstructures 120 corresponding to the central region CA.

For example, in FIG. 5, the light guide plate 110 is divided into nine sub-regions from a first sub-region P1 to a ninth sub-region P9 according to a side length from left to right and from top to bottom at equal intervals. In terms of the area density of the optical microstructures 120, the area densities in the first sub-region P1 and the third sub-region P3 are greater than the area density in the second sub-region P2; the area densities in the fourth sub-region P4 and the sixth sub-region P6 are greater than the area density in the fifth sub-region P5; and the area densities in the seventh sub-region P7 and the ninth sub-region P9 are greater than the area density in the eighth sub-region P8. In addition, the area density of the optical microstructures 120 in a descending order is: the first sub-region P1, the fourth sub-area P4, and the seventh sub-area P7; the area density of the optical microstructures 120 in the descending order is: the second sub-region P2, the fifth sub-region P5, and the eighth sub-region P8; and the area density of the optical microstructures 120 in the descending order is: the third sub-region P3, the sixth sub-region P6, and the ninth sub-region P9. Furthermore, a difference in area density between the second sub-region P2 and the fifth sub-region P5 is greater than a difference in area density between the eighth sub-region P8 and the fifth sub-region P5.

In the embodiment, the plurality of optical microstructures 120 are located on the first surface 110A of the light guide plate 110 (i.e., the surface of the light guide plate 110 away from the optical film 140); but in other embodiments, the plurality of optical microstructures 120 may also be located on the second surface 110B of the light guide plate 110. In the embodiment, each optical microstructure 120 is a protruding structure; but in other embodiments, each optical microstructure 120 may also be a concave structure. In the embodiment, each optical microstructure 120 has approximately the same size; but in other embodiments, each optical microstructure 120 may also have a different size, i.e., the area density of the optical microstructures 120 may be controlled by the size of the optical microstructures 120. In the embodiment, the optical microstructure 120 is hemispherical, but the disclosure is not limited thereto. In other embodiments, the plurality of optical microstructures 120 may also have other configurations.

Referring to FIG. 1 and FIG. 2 again, the light source module 100 further includes a reflector 150. The reflector 150 is disposed on the first surface 110A to reflect the light beam I emitted from the first surface 110A of the light guide plate 110 back into the light guide plate 110, and a reflectivity of the reflector 150 may be a fixed value or a non-fixed value. In the embodiment, the reflectivity of the reflector 150 is, for example, unevenly distributed; i.e., the reflectivity at various points on a reflective surface of the reflector 150 is not a constant value. In detail, in the embodiment, through a gradient reflective design, light reflection abilities in individual regions (for example, the regions corresponding to the first edge region PA1, the second edge region PA2, the third edge region PA3 and the fourth edge region PA4) on the reflector 150 are increased (or decreased). For example, printing technology may be used to perform gradual printing on the surface of the reflector 150 to increase or decrease the reflectivity of different positions on the surface of the reflector 150. To be specific, the reflectivity of the reflector 150 may be increased from the geometric center CM along the first direction D1 and the second direction D2. In addition, the reflectivity of the reflector 150 may be increased along the third direction D3, and the third direction D3 is perpendicular to the first direction D1. In this way, the effect that the luminance of the edge portions on both sides of the image corresponding to the display region is greater than the luminance of the center portion of the image corresponding to the display region may be further enhanced, so as to improve the luminance uniformity of the display image viewed by human eyes. In other embodiments, the light guide plate 110 may not be provided with the plurality of optical microstructures 120, but only relies on the reflector 150 with the gradient reflective design to achieve the above-mentioned optical effect.

Figure 6:
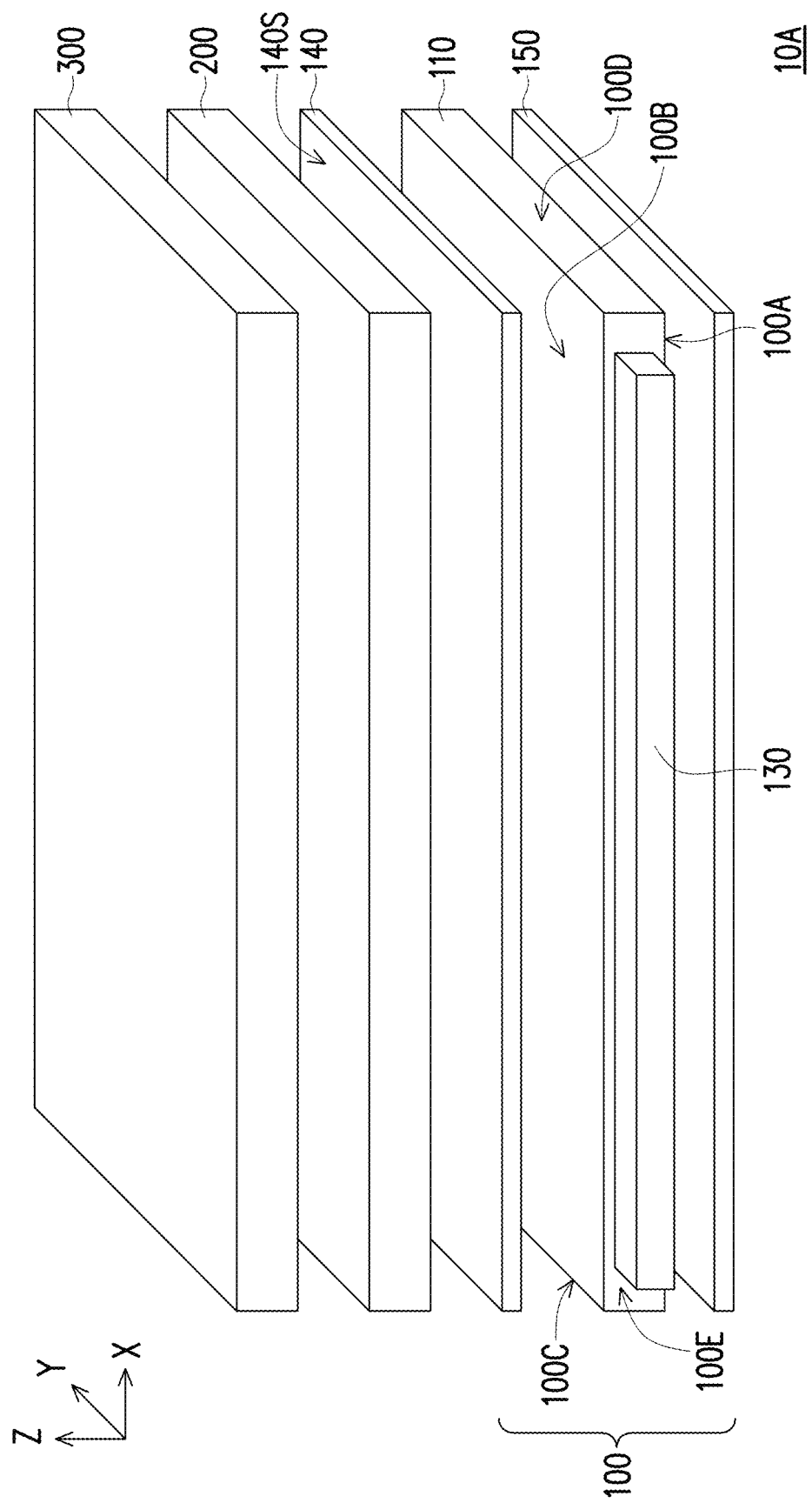
FIG. 6 is a three-dimensional schematic diagram of a display apparatus according to another embodiment of the disclosure.

The light distribution pattern (bathtub distribution pattern) of the light-emitting surface provided by the disclosure is not only suitable for the display apparatus with a simple display function in FIG. 1, but is also suitable for a privacy display apparatus. Specifically, FIG. 6 is a three-dimensional schematic diagram of a display apparatus according to another embodiment of the disclosure. Referring to FIG. 6, a display apparatus 10A of the embodiment of FIG. 6 is similar to the display apparatus 10 of FIG. 1, and differences there between are as follows. In the embodiment, the display apparatus 10A further includes a privacy module 300. The display panel 200 is located between the privacy module 300 and the light guide plate 110. The privacy module 300 may be a liquid crystal panel module, and the display apparatus 10A may be switched between an privacy mode and a sharing mode. In the display apparatus 10A of the embodiment, through a special design of the light source module 100, the problem of dark periphery when the sharing mode is turned on may be mitigated.

Figure 7:
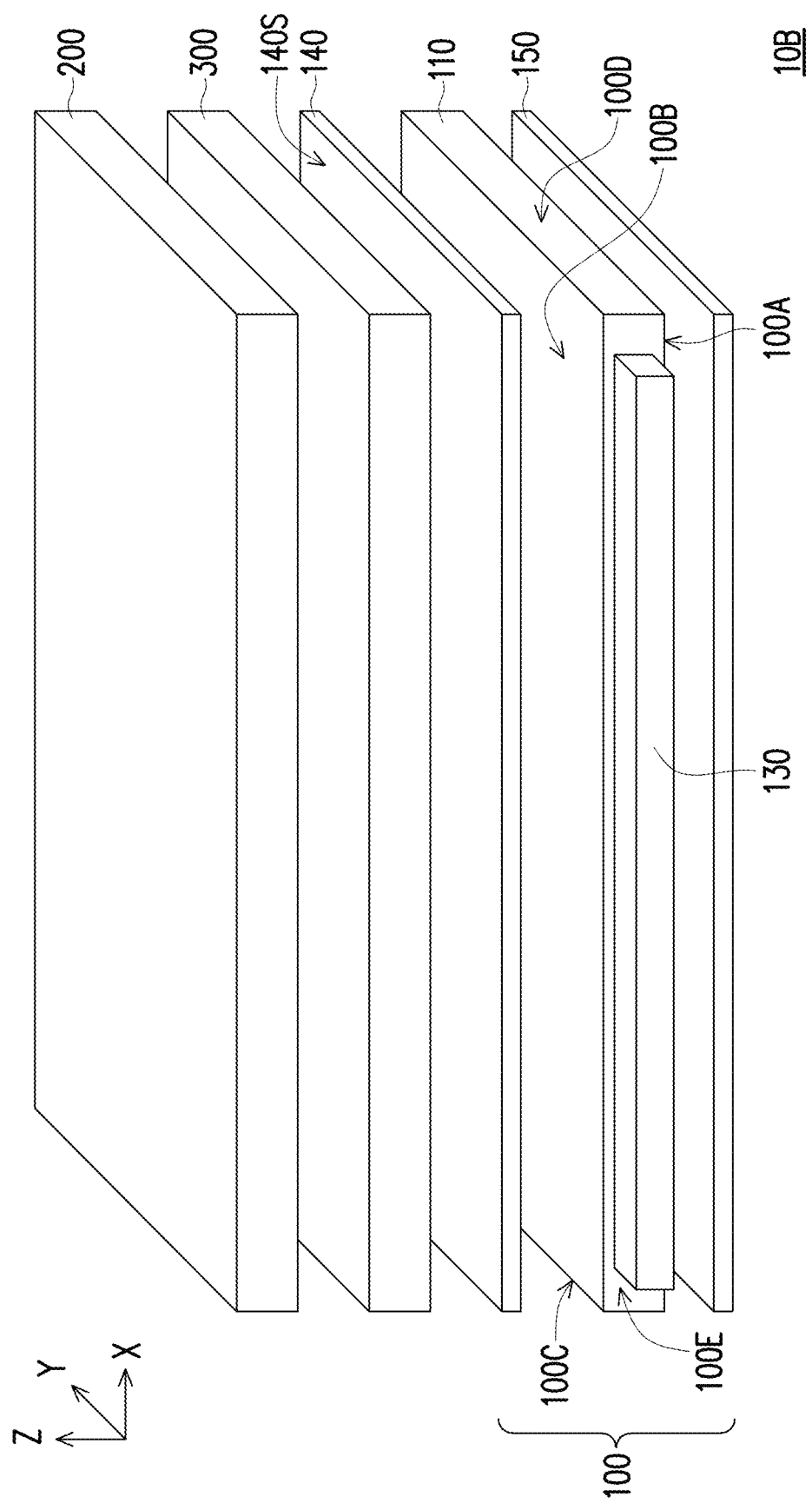
FIG. 7 is a three-dimensional schematic diagram of a display apparatus according to still another embodiment of the disclosure.

FIG. 7 is a three-dimensional schematic diagram of a display apparatus according to still another embodiment of the disclosure. Referring to FIG. 7, a display apparatus 10B of the embodiment of FIG. 7 is similar to the display apparatus 10A of FIG. 6, and differences there between are as follows. In the embodiment, the privacy module 300 is located between the display panel 200 and the light guide plate 110. In the display apparatus 10B of the embodiment, through the special design of the light source module 100, the problem of dark periphery when the sharing mode is turned on may be mitigated.

In summary, in the light source module and the display apparatus of the embodiment of the disclosure, the average luminance in the first edge region is greater than the average luminance in the central region, and the average luminance in the second edge region is greater than the average luminance in the central region, by designing the luminance of the periphery of the display region to be greater than the luminance of the center, the effects of optimizing the image quality of the display and enhancing the visual comfort experience of the human eyes without changing a stacking structure of the display apparatus are achieved. In the embodiment of the disclosure, through appropriate configuration of the optical microstructures and/or the reflector, the required light distribution pattern is presented on the light-emitting surface of the light source module (for example, a bathtub distribution pattern with a brighter periphery and a darker center is formed), so as to enhance the visual comfort experience of the human eyes.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:
1. A light source module, comprising:
   a light guide plate, having a first surface, a second surface opposite to the first surface, a first side surface, a second side surface opposite to the first side surface, and a light incident surface connecting the first surface, the second surface, the first side surface and the second side surface;

a light-emitting assembly, disposed beside the light incident surface and adapted to provide a light beam toward the light incident surface; and an optical film, disposed on the second surface, and having a light-emitting surface parallel to the second surface and away from the light guide plate;

wherein the light-emitting surface comprises a first edge region adjacent to the first side surface, a second edge region adjacent to the second side surface, and a central region, the central region is located between the first edge region and the second edge region and comprises a geometric center of the light-emitting surface, the first edge region, the second edge region, and the central region do not overlap with each other, an average luminance in the first edge region is greater than an average luminance in the central region, and an average luminance in the second edge region is greater than the average luminance in the central region, wherein the light guide plate further comprises a plurality of optical microstructures located on the first surface, an area density of the optical microstructures is increased from the geometric center along a first direction and a second direction opposite to the first direction, and the area density of the optical microstructures is increased along a third direction, wherein the first direction is parallel to the light incident surface, and the third direction is parallel to a normal line of the light incident surface and is away from the light incident surface.

2. The light source module as claimed in claim 1, wherein a ratio of the maximum luminance in the second edge region to the maximum luminance in the central region is between 1.01 and 1.2.

3. The light source module as claimed in claim 1, wherein an arrangement direction of the first edge region and the second edge region is parallel to the light incident surface, and areas of the first edge region and the second edge region are the same, wherein a difference between the average luminance in the first edge region and the average luminance in the second edge region is less than 5% of the average luminance in the first edge region.

4. The light source module as claimed in claim 3, wherein the light-emitting surface further comprises a third edge region and a fourth edge region, the third edge region is adjacent to the light incident surface, an arrangement direction of the third edge region and the fourth edge region is not parallel to the light incident surface, the central region is located between the third edge region and the fourth edge region, an average luminance in the third edge region is greater than the average luminance in the central region, and an average luminance in the fourth edge region is greater than the average luminance in the central region.

5. The light source module as claimed in claim 3, wherein an area density of the optical microstructures corresponding to the first edge region is greater than an area density of the optical microstructures corresponding to the central region, and an area density of the optical microstructures corresponding to the second edge region is greater than the area density of the optical microstructures corresponding to the central region.

6. A light source module, comprising:
a light guide plate, having a first surface, a second surface opposite to the first surface, a first side surface, a second side surface opposite to the first side surface, and a light incident surface connecting the first surface, the second surface, the first side surface and the second side surface;

a light-emitting assembly, disposed beside the light incident surface and adapted to provide a light beam toward the light incident surface;

an optical film, disposed on the second surface, and having a light-emitting surface parallel to the second surface and away from the light guide plate; and a reflector disposed on the first surface, wherein a reflectivity of the reflector is unevenly distributed, wherein the light-emitting surface comprises a first edge region adjacent to the first side surface, a second edge region adjacent to the second side surface, and a central region, the central region is located between the first edge region and the second edge region and comprises a geometric center of the light-emitting surface, the first edge region, the second edge region, and the central region do not overlap with each other, an average luminance in the first edge region is greater than an average luminance in the central region, and an average luminance in the second edge region is greater than the average luminance in the central region.

7. The light source module as claimed in claim 6, wherein the reflectivity of the reflector is increased from the geometric center along a first direction and a second direction opposite to the first direction, and the reflectivity of the reflector is increased along a third direction, wherein the first direction is parallel to the light incident surface, and the third direction is perpendicular to the first direction.

8. A display apparatus, comprising:
a light source module, comprising:
a light guide plate, having a first surface, a second surface opposite to the first surface, a first side surface, a second side surface opposite to the first side surface, and a light incident surface connecting the first surface, the second surface, the first side surface and the second side surface;

a light-emitting assembly, disposed beside the light incident surface and adapted to provide a light beam toward the light incident surface;

an optical film, disposed on the second surface, and having a light-emitting surface parallel to the second surface and away from the light guide plate; and a display panel, disposed above the light source module, wherein the optical film is located between the light guide plate and the display panel; and a privacy module, wherein the privacy module is located between the display panel and the light guide plate, or the display panel is located between the privacy module and the light guide plate, wherein the light-emitting surface comprises a first edge region adjacent to the first side surface, a second edge region adjacent to the second side surface, and a central region, the central region is located between the first edge region and the second edge region and comprises a geometric center of the light-emitting surface, the first edge region, the second edge region, and the central region do not overlap with each other, an average luminance in the first edge region is greater than an average luminance in the central region, and an average luminance in the second edge region is greater than the average luminance in the central region.

* * * * *